Sept. 5, 1961  R. L. CARVER  2,999,164
STORAGE SHIELD FOR RADIOACTIVITY DEVICE
Filed Feb. 11, 1959  3 Sheets-Sheet 1

Inventor:
Robert L. Carver
By: Graf, Nierman & Burmeister
Attorneys

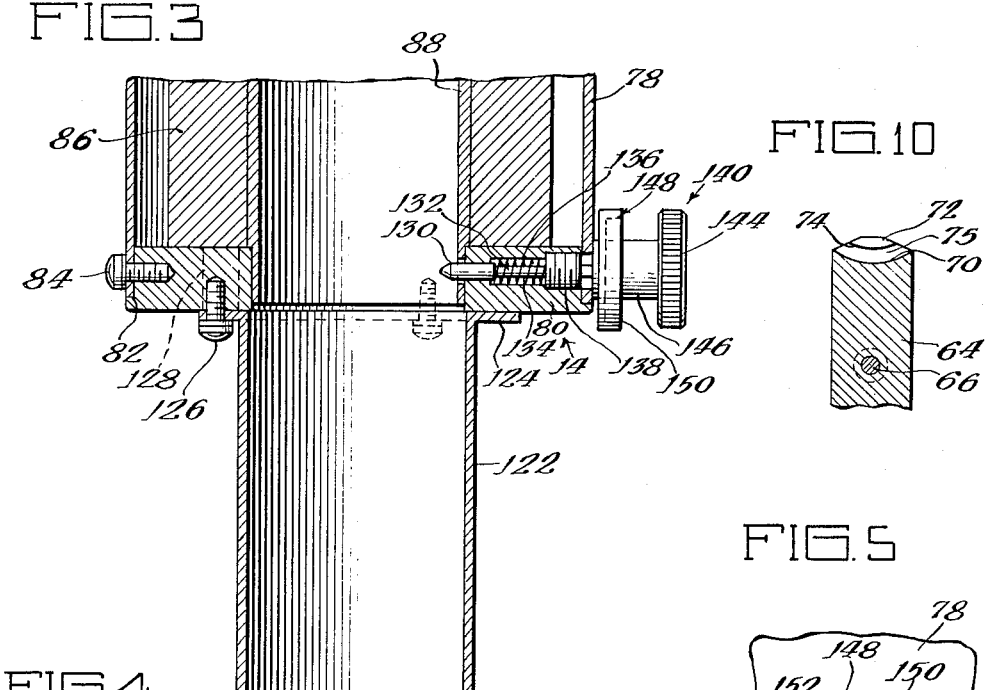

Sept. 5, 1961 R. L. CARVER 2,999,164
STORAGE SHIELD FOR RADIOACTIVITY DEVICE
Filed Feb. 11, 1959 3 Sheets-Sheet 3
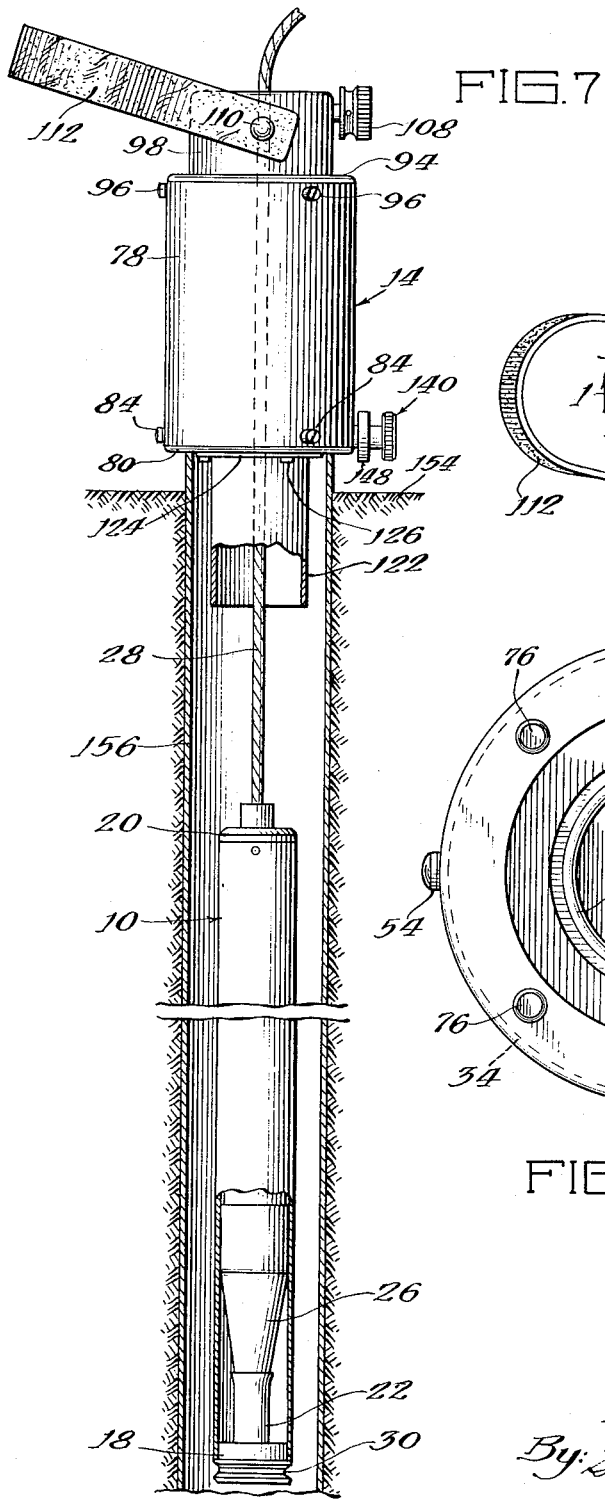
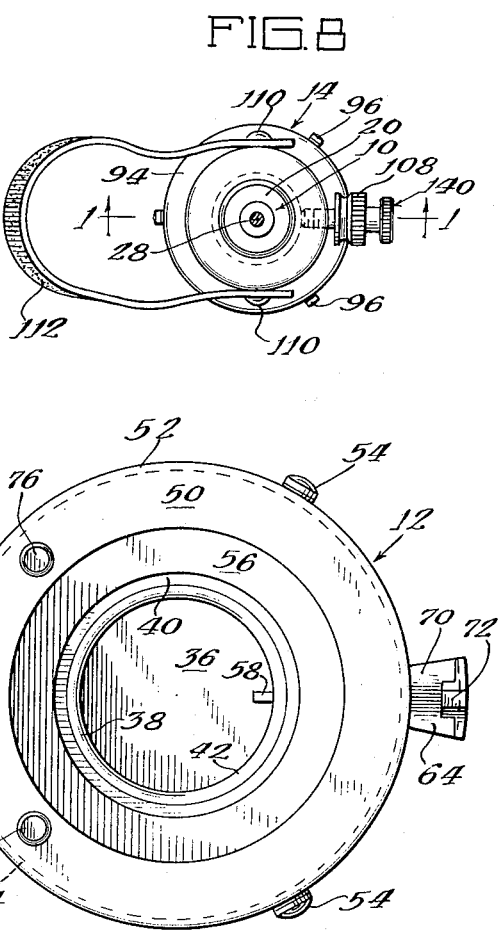
Inventor:
Robert L. Carver
By: Graf, Nieman & Burmeister
Attorneys

United States Patent Office 2,999,164
Patented Sept. 5, 1961

2,999,164
STORAGE SHIELD FOR RADIOACTIVITY DEVICE
Robert L. Carver, Des Plaines, Ill., assignor to Nuclear-Chicago Corporation, Cook County, Ill., a corporation of Delaware
Filed Feb. 11, 1959, Ser. No. 792,596
12 Claims. (Cl. 250—108)

This invention relates to an improvement in shielding devices for radioactivity sources, and more specifically to a carrying shield for the storage and transportation of devices including radioactivity sources. The invention is herein described in connection with an embodiment wherein the shield construction of the invention is employed as a carrying shield for an elongated source-and-detector probe of the type used in making measurements of characteristics of materials such as the density of soil, by lowering the probe into boreholes made for the purpose.

One limitation on the widespread use of radioactivity devices is the hazard of irradiation of personnel. This hazard is, of course, most serious where high-level radioactivity sources are employed, but also exists even with sources of relatively low level because of the cumulative effects of radiation. Accordingly, in the use of such devices, particularly portable devices for field use which may come into proximity with persons having no knowledge of the hazard, it is customary to carry and store the device, or at least the portion of the device containing the radioactivity source, in a shield container, commonly a lead-walled case of appropriate shape. However, the employment of a mere case or box, of an ordinary construction, except for the wall material, leaves a possibility, or even a probability, of creation of a danger due to error, and also provides no adequate safeguard for the person who handles the device in the periods of its actual use.

The nature of these hazards is best understood by considering a particular example of a utilization of a radioactivity device in operations of an industrial nature, in the proximity of persons completely ignorant of radioactivity and its effects, and by operators unaccustomed to the caution which such devices normally require. A good example of such a utilization is in the measurement of soil characteristics such as density. Such measurements are made in the field in applications such as soil research and measurement of the load-bearing capacity of soils in construction work. In each of such applications of radioactivity, the device is necessarily used, in order to be economically practical, by persons relatively inexperienced in the handling of radioactive materials, and in the presence of persons completely ignorant of the subject. An instrument for such a purpose includes a probe incorporating a radioactivity source, normally a source of gamma rays, and one or more appropriate detectors for measuring the scattered radiation returned to the probe, which is a function of the properties of the surrounding material, thus constituting the output of the detector an indirect measurement of the properties of interest. In view of the fact that such measurements are conventionally made by inserting the probe structure into boreholes made for the purpose and taking the measurements at various depths, probes for this purpose are commonly of a long cylindrical form with the radiation source in one longitudinal portion, generally the lower end, and the detectors (and usually a preamplifier), in another longitudinal portion, the output signal of the probe being carried to the surface through a suitable electrical cable, which may also constitute the support by means of which the probe is positioned in the boreholes.

Such probes, if properly designed as regards sensitivity and discrimination against unwanted or spurious signals, do not require high-level radiation sources, but nevertheless inevitably employ sources to which prolonged exposure of personnel would be a hazard. If the probe is merely placed in a lead container of conventional construction for handling and storage, a number of hazards arise from the possibility of error on the part of the operator actually using the probe. Such an arrangement provides no safeguard, for example, against merely leaving the box open. Nor is there any assurance that the operator will not, through inadequate exercise of caution, leave the probe unshielded. Further, such an arrangement provides no protection for the operator during periods when the probe is in use, as in carrying the probe from one place to another in the course of making a series of measurements after removal from its carrying case.

The present invention provides a novel construction for a carrying shield for radioactivity devices which is well adapted for field use for the purpose of minimizing radiation hazards both to the operator of the radioactivity device and to other persons who might otherwise be accidentally exposed to radiation from the source incorporated in the device. In the embodiment of the invention to be described, the radioactivity device is an elongated cylindrical source-and-detector probe having the radioactivity source employed in the making of measurements incorporated in the end portion of the probe. The shield is constructed in two portions forming a continuous cavity receiving the probe when in mutual abutment. One portion of the shield is designed to receive the end of the probe carrying the source when the device is stored. The second portion of the shield is designed to be carried about when the probe is in use. Provision is made for moving the probe between a position wherein the source is in the first shield portion and a position wherein the source is in the second shield portion, which is carried with the probe when the latter is in use. It will be seen that in the absence of special provision, such an arrangement presents the possibility of creation of a hazard if the device and the carrying portion of the shield are separated from the storage portion of the shield at a time when the source is within the storage portion, for under these circumstances the source will then be completely unshielded. In the construction of the present invention, the two portions of the shield cannot be separated unless the source is within the carrying portion of the shield, thus assuring that the operator cannot accidentally remove the carrying portion and the probe from the storage shield and thus create a hazard.

Additionally, the present invention provides a shield construction which is extremely convenient to use and at the same time presents a minimum of radiation hazard to both the operator and to other persons who may be in the vicinity. For understanding of the manner in which the invention achieves these advantages, and further advantages which will become apparent, reference is made to the embodiment of the invention illustrated in the attached drawing, in which:

FIGURE 3 is an enlarged longitudinal sectional view of a portion of the shield structure of FIGURES 1 and 2;

FIGURE 4 is an enlarged fragmentary sectional view of another portion of the shield of FIGURES 1 and 2;

FIGURE 5 is an enlarged view in elevation, partially in section taken along the line 5—5 of FIGURE 1;

FIGURE 7 is a view partially in section and partially in elevation illustrating the manner of use of the probe and its associated carrying shield portion in making measurements in a borehole;

FIGURE 8 is a top plan view of the assembly in FIGURE 7;

FIGURE 9 is a top view in elevation of the bottom portion of the shield, taken along the line 9—9 of FIGURE 4; and FIGURE 10 is a fragmentary sectional view of a latch or catch constituting a portion of the device, taken along the line 10—10 of FIGURE 4.

Figure 1:
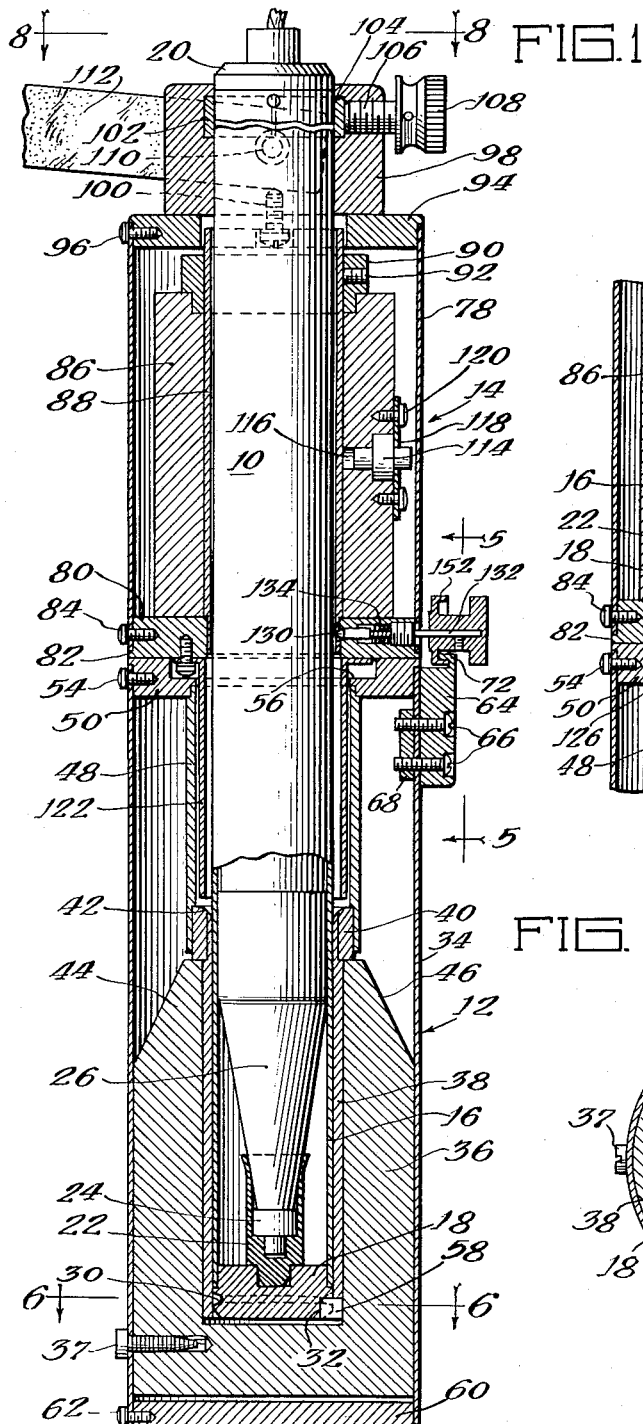
FIGURE 1 is a view in longitudinal section, taken along the line 1—1 of FIGURE 8, illustrating the carrying shield of the invention with a source-and-detector probe installed therein in the condition of storage.

As seen in FIGURE 1 of the drawing, the elongated source-and-detector probe 10 is encased in a storage shield assembly consisting of a bottom shield, generally designated 12, and a top shield, generally designated 14.

Except as relevant to the shield construction which is the subject of the present invention, the probe 10 will not be described in detail herein, since the internal construction of the probe constitutes in itself no portion of the present invention. The illustrated probe is wholly enclosed in a tubular housing 16 having a bottom cap 18 and a top cap 20. The upper portion of the probe 10 (illustrated in the drawing only in external elevation) contains one or more radiation detectors, such as Geiger counters, along with an appropriate preamplifier. In the lower end of the tubular housing 16, mounted on the bottom cap 18, is a cup-shaped member 22, of polyethelene or other material resistant to radiation damage. The bottom of the cup or sleeve 22 is formed with a central bore receiving in suitable fashion a radiation source holder 24 containing a gamma-ray source of suitable intensity for the desired measurements. A conical shield 26 has its lower end wedged into the mouth of the cup 22 and shields the radiation detecting equipment in the upper portion of the probe from direct radiations from the source 24. The shield 26 is constructed of lead or similar material employed for gamma-ray shielding. A cable (see FIGURE 7) extends through the top cap 20 and serves to supply electrical power to the detecting equipment and conduct the pulse signals from the detecting equipment to suitable counting equipment (not shown). The bottom cap 18 has a circumferential groove 30, and also a short longitudinal slot 32.

The bottom shield 12 is contained in a tubular casing 34. A more or less cup-shaped shield block 36 is secured by screws 37 in the lower portion of the tubular casing 34. A steel liner 38 lines the central bore of the cup-shaped shield block 36, which is also of lead or similar gamma-ray shielding material, the outer end of the liner extending above the mouth of the shield block. A collar 40 is nested over a shoulder formed on the liner 38 and has a curved interior bevel at 42. The tubular housing 16 of the probe slides fairly snugly in the liner 38 of the shield block, and the bevel at 42 serves to guide the probe into the shield block in insertion. The upper portion 44 of the shield block 36 is externally conically tapered at 46. This tapering reduces the required mass of lead necessary for shielding the source 24 from the exterior when the probe is positioned in the shield block 36, since radiation from the source incident upon this portion of the shield block traverses the shield block at an angle such that thickness reduction of the shield block at this point is permissible without creating leakage of radiation.

A guide tube 48 is suitably mated at its lower end with the collar 40 and at its upper end with a top annular ring 50 which has a flange or shoulder 52 (see FIGURE 4) seated on the upper end of casing 34 and which is secured to the casing by screws 54. The ring 50 also has a central recess or shoulder 56.

Secured in the lower end of the shield liner 38 is a flat key 58 which engages the slot 32 in the bottom cap of the probe 10 to prevent rotation of the probe when it is installed in the bottom shield. The enclosure or housing of the bottom shield 12 is completed by a bottom cap 60 secured by radially extending screws 62.

At the top end of the bottom shield 12, there is secured to one portion of the circumference of the casing 34 a clamp or catch member 64. Screws 66 and a threaded backing member 68 are employed to position the catch member 64. The upper surface 70 of the main or body portion is concave in the shape of the arc of a circle (best seen in FIGURE 10). A hook or reentrant portion or extension 72 is formed with a downwardly facing convex surface 74 concentric with the upwardly facing concave surface 70 to form in essence a slot 75 in the form of a segment of a circle. On portions of the top ring 50 of the lower shield 12 circumferentially displaced from the catch member 64 are upwardly extending studs 76.

The top shield 14 is enclosed in a tubular casing 78 similar to the tubular casing 34 of the bottom shield 12. A bottom ring 80 is seated by means of a shoulder or flange 82 on the lower end of the tubular casing 78 and secured therein by radially extending screws 84. A tubular shield block 86, again of lead or similar material, lined with a steel liner 88, rests on the bottom ring 80 and is clamped in position by a collar 90 which is secured by set screws 92 to the extending end of the liner 88. A top ring 94 is secured in place by radially extending screws 96 and in the same manner as the top and bottom rings previously described.

Secured to the top ring 94 by means of screws 100 is an annular housing block 98. A split ring clamp 102 is seated in an internal groove in the housing block 98 and is selectively clamped against, or released from, the probe by a radially extending clamping screw 106 with a suitable knob 108. Diametrically opposed pivots 110 on the housing block 98 serve to mount the ends of a leather carrying strap 112.

A calibration source 114 of very low radiation intensity is seated in the outer surface of the shiled block 86, the axis of the block being exposed to radiations from this source by an aperture 116 in the shield block. The source 114 is held in place by a clamping plate 118 and screws 120.

To the lower end of the upper shield 14 there is secured a downwardly extending guide tube 122, having a flange 124 secured by screws 126 to the ring 80. The diameter of the guide tube 122 freely passes the probe 10 and fits the guide tube 48 of the lower shield. When the two portions of the shield are engaged (FIGURES 1 and 2) the flange 124 and the screws 126 are accommodated by the recess 56 in the upper ring 50 of the lower shield. The lower ring 80 of the upper shield has socket bores 128 coresponding in position with the studs 76 on the upper ring 50 of the lower shield.

At the circumferential position of the lower ring 80 of the upper shield corresponding to the position of the catch member 64 on the lower shield, a plunger 130 having an extension shank 132 extends radially into the liner 88. A compression spring 134 surrounding the shank 132 and seated in a counterbore 136 in the ring 80, and maintained in position by an externally threaded bushing 138 screwed into the ring 80, urges the plunger 130 into the axial opening in the top shield. On the outer end of the shank 132 is a catch knob 140 secured by a set screw 142. The outer end of knob 140 has a knurled head 144, which is joined by a shank portion 146 to an inner catch flange 148. The flange 148 has an annular recess or groove 150 which forms an outwardly facing lip or rim 152.

The details of construction having been described, the mode or manner of operation and use of the device illustrated may readily be understood from consideration of the manner of cooperation of the portions of the structure in the two principal positions or conditions of the parts, i.e., the condition wherein the probe is stored in the shield and the condition wherein the probe is removed from the shield for use, and the manner in which the parts are manipulated to produce these desired conditions.

Choosing as a starting point in the cycle of operations the condition wherein the probe is not in use and is stored in the shield, it will be seen that this condition is illustrated in FIGURE 1. The lower shield 12 may be fastened into a suitable carrying case (not shown) for storage and transportation of the probe. In this condition, the probe is firmly seated in the shield assembly, clamped at the top end by the split clamp 102, tightened by the screw 106, and held at the bottom end against vibration or rotation by the snug fit of the probe into the bottom liner 38 and keying of the key 58 in the slot 32. The conical shield 26 within the probe itself and the bottom shield block 36 are effective to prevent any leakage of radiation from the source 24 to the exterior. (As previously indicated, the magnitude of the calibration source 14 is negligible as regards any radiation hazard.)

The lower shield 12 and upper shield 14 are securely locked together. The studs 76 are engaged in the socket bores 128. The hook 72 on the catch member 64 is securely interlocked with the rim 152 on the knob 140, this rim being seated in the groove 75 which is concentric with the knob 140. With the probe in this inserted position, the catch consisting of the member 64 on the lower shield and the knob 140 on the upper shield cannot be disengaged because the casing of the probe 10 holds the pin 130 out of the central bore of the upper shield, thus keeping the catch members engaged against the force of the spring 134. The entire assembly can be unlocked only by loosening the clamp 102 and withdrawing the probe completely from the lower shield 12 into the upper shield 10. When the probe is so withdrawn, as indicated by an arrow in FIGURE 2, when the circumferential groove 30 in the lower end of the probe reaches the pin 130, the latter snaps into the groove under the action of the spring 134 and latches the probe into this withdrawn position.

It will be noted that calibration of the device is accomplished in the storage position of FIGURE 1, wherein the calibration source 114 bombards the detector portion of the probe. The presence of the upper shield block 86 in this storage or calibration condition shields the detector portion of the probe from external background radiation, so that the accuracy of calibration is independent of background variation even though a calibration source 114 of extremely low intensity, such as 15 microcuries, be used. The engagement of the key in the shield with the slot in the probe standardizes the position of the detector in the probe with respect to the source.

Figure 2:
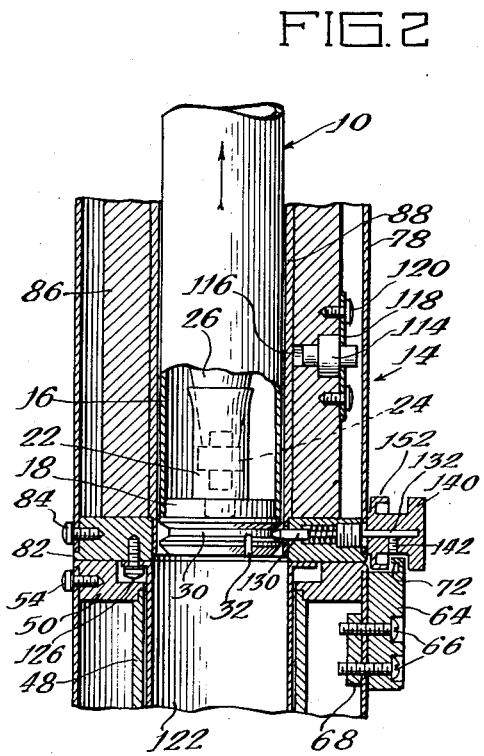
FIGURE 2 is a view similar to FIGURE 1 but illustrating the parts in a condition preparatory to use of the probe.
Figure 6:
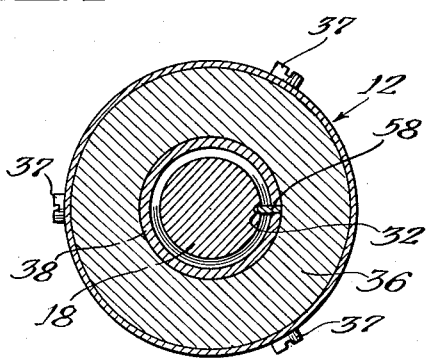
FIGURE 6 is a transverse sectional view taken along the line 6—6 of FIGURE 1.

When the probe has been withdrawn to the position shown in FIGURE 2, the operator may remove the probe and top shield from the bottom shield by mere drawing up of the carrying strap 112. It will be noted that when the probe and top shield are picked up in this manner, the radiation from the source 24 is confined to a relatively small solid angle beneath the shield, the flexibility of the carrying strap 112 and the pivots at 110 serving to keep the shield vertical without effort on this behalf on the part of the operator. The radiation from the source 24, although adequate for the measurement to be made, is nevertheless sufficiently low so that no hazard arises due to this low-angle radiation, which is confined, even in the absence of care, to the relatively radiation-insensitive lower portions of the legs of the operator or any other persons in the vicinity. It will likewise be noticed, of course, that the source is exposed through the unshielded portion of the bottom shield in the transitory condition during which the probe is being withdrawn into the upper shield. Here again, however, the period of exposure is so short, unless someone should deliberately fasten the clamp 102 with the probe in this intermediate position, that no hazard is presented, 3 millicuries being a typical size employed in such a probe.

In FIGURE 7, the device is shown in a typical use, the measurement of the density of soils. In such use, an appropriate bore is made in the earth 154 under measurement, and a borehole liner pipe 156 is inserted. With the probe withdrawn as previously indicated, the guide tube 122 is lowered into the top of the pipe 156 until the upper shield 14 rests on the upper end of the pipe. The probe is then unlatched by pulling out the knob 140, and the probe lowered to the desired depth either by means of the electrical cable 28 or by means of other supports not shown. At the conclusion of the desired measurements (the amount of activity detected by the detector from scattering of radiation by the surrounding earth being an indication of its density), the probe is again pulled up into the shield to the point where the pin 130 snaps into the groove 30.

At the conclusion of use, the upper shield is again handled by the strap 112, and the guide tube 122 is inserted into the central guide tube 48 of the lower shield. When the studs 76 and sockets 128 are matched, the condition of FIGURE 2 is restored. Thereupon the pin 130 is released from the groove 30 by pulling the knob 140, and the probe is lowered into the bottom shield and rotated until the key 58 is engaged. The clamp 102 is tightened by the knob 108 and the device is then again in the storage and calibration condition.

It will be observed that the hazards of long-time exposure of personnel to the source due to accident or ignorance are minimized by the construction described. Except in repair, there is no occasion for removing the probe from both portions of the shield except into the medium under measurement. The top portion of the shield cannot be accidentally removed from the bottom of the shield to leave the source encased in neither. Except in the case of deliberate fastening of the probe in an intermediate position, the probe has only two stable positions, one in which the source is safely encased in the lower portion of the shield and one in which the source is safely encased in the upper portion of the shield. The two portions of the shield are securely locked together at all times except when the source is in the latter position. The elongated conical shield 26 prevents radiation through the top of the tubular upper shield in either position of the probe.

It will of course be understood that the illustrated and described embodiment of the invention is merely an embodiment selected for the required illustration and description in accordance with the patent laws. Persons skilled in the art will readily adapt the teachings of the invention to embodiments far different, both in appearance and in details of operation and construction, from the embodiment herein illustrated. Accordingly, the scope of the protection to be afforded the invention should not be determined from the particular embodiment illustrated and described, but in accordance with the language and spirit of the annexed claims.

What is claimed is:

1. A two-piece carrying shield for a device including a radioactivity source, said shield comprising a pair of hollow shield members, means on the shield members responsive to the position of the device to lock the two members together when the device is partially within each, and means responsive to withdrawal of the device from one of the members into the other member to unlock the locking means to permit separation of the shield members.

2. A shielded radioactivity source assembly comprising a member containing a radioactivity source, a pair of shield members each having a shielded cavity, means on the shield members responsive to the position of the source-bearing member to lock the two shield members together when the source-bearing member is partially within each, and means responsive to withdrawal of the source-bearing member from one of the shield members into the other shield member to unlock the locking means to permit separation of the shield members.

3. A shielded radioactivity source assembly comprising a source-bearing member, a cup-shaped shielding member, a second shielding member abutting the open end of the first shielding member, means on the shield members responsive to the position of the source-bearing member to lock the two members together when the source is within the cup-shaped member, and means responsive to withdrawal of the source-bearing member from the cup-shaped member into the other shielding member to unlock the locking means to permit separation of the shield members.

4. A radioactivity probe and carrying shield assembly comprising an elongated probe, a top shield member having an aperture adapted to slidingly pass the probe, a bottom shield member including a receptacle for the lower end of the probe, locking means interconnecting the top and bottom shield members, and means responsive to withdrawal of the probe into the top shield member to unlock the locking means.

5. A radioactivity probe and carrying shield assembly comprising an elongated probe having a recess on the outer surface thereof, a top shield member having an aperture adapted to slidingly pass the probe, a bottom shield member including a receptacle for the lower end of the probe, a plunger in the lower portion of the top shield member reciprocable between an advanced position assumed when the inner end is seated in the recess, and a withdrawn position assumed when the inner end abuts an unrecessed portion of the outer surface of the probe, and catch members on the plunger and on the upper portion of the bottom shield member, said catch members being mutually engaged in the withdrawn position of the plunger and disengaged in the advanced position of the plunger, whereby the upper and lower shield members are mutually locked together when the plunger abuts a portion of the probe other than the recess.

6. A carrying shield for an elongated device including a radioactivity source, said shield comprising a cup-shaped bottom shielding member and a tubular top shielding member having a bore adapted to slidingly pass the elongated device, locking means interconnecting the top and bottom shielding members, and means on the shielding members to unlock the locking means in response to withdrawal of the device from the bottom shielding member.

7. A carrying shield for an elongated device including a radioactivity source, said shield comprising a cup-shaped bottom shielding member and a tubular top shielding member having a bore adapted to slidingly pass the elongated device, a plunger extending through the bottom portion of the wall of the top shielding member, a first catch member secured to the top portion of the bottom member, a spring urging the plunger inwardly, and a second catch member on the outer end of the plunger engaging the first catch member when the inner end of the plunger extends into the bore, but disengaging the first catch member when the inner end of the plunger is withdrawn into the wall, and a flexible handle on the top portion of the top shielding member.

8. A carrying shield for an elongated device including a radioactivity source, said shield comprising a cup-shaped bottom shielding member and a tubular top shielding member having a bore adapted to slidingly pass the elongated device, said bore being in alignment with the cavity of the cup-shaped bottom shielding member to form an elongated receptacle region, a member extending into said receptacle region, locking means on the shielding members to lock the shielding members together, and means responsive to motion of said member extending into the receptacle region to selectively lock and unlock the locking means.

9. In a radioactivity device, a radioactivity source, a shield member around the source having an opening, means for moving the source into and out of the shield member through the opening, a second member having a mouth abutting the first member and registering with the opening in the first member, cooperating disengageable locking means on the abutting portions of the respective members, means responsive to motion of the source to a position fully within the shield member to disengage said locking means, and means responsive to motion of the source from said position to lock the locking means against disengagement, whereby the shield member and the second member are locked against disengagement unless the source is in the shield.

10. In a radioactivity device, an elongated tubular shield, a source-and-detector probe slideable in the tubular shield and containing a radioactivity source in one longitudinal portion and a shielding member in an outward longitudinal portion blocking the escape of radiation from the outer end of the tubular shield, a tubular member adapted to receive the probe and having a mouth abutting the inner end of the shield, cooperating disengageable locking means on the shield and the tubular member, and means responsive to motion of the probe to selectively engage and disengage the locking means.

11. In a radioactivity device, a receptacle having a cavity therein, a source-holding member movable into and out of the cavity, a movable member extending into the cavity in the path of motion of the source-holding member, a locking member on the recepacle operatively coupled to the movable member, and a second receptacle adjacent to the first receptacle having a locking portion engaging the locking member on the first receptacle when the latter is in the locked position.

12. The device of claim 11 wherein the source-holding member has a recess in the surface thereof, the locking member being in the unlocked position when the movable member is seated in the recess.

References Cited in the file of this patent

UNITED STATES PATENTS

| 2,495,781 | Silverman | Jan. 31, 1950 |
| 2,711,485 | Pennock et al. | June 21, 1955 |
| 2,769,921 | Nahin et al. | Nov. 6, 1956 |

FOREIGN PATENTS

| 676,462 | Great Britain | July 30, 1952 |